(12) United States Patent  
Hicks et al.

(10) Patent No.: US 9,410,464 B2
(45) Date of Patent: Aug. 9, 2016

(54) PERFORATED MIXING PIPE WITH SWIRLER

(71) Applicant: Tenneco Automotive Operating Company Inc., Lake Forest, IL (US)

(72) Inventors: Joshua Hicks, Linden, MI (US); Ryan A. Floyd, Mason, MI (US); Manoj K. Sampath, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 155 days.

(21) Appl. No.: 13/960,151

(22) Filed: Aug. 6, 2013

(65) Prior Publication Data

US 2015/0040537 A1    Feb. 12, 2015

(51) Int. Cl.
| | |
|---|---|
| *F01N 3/00* | (2006.01) |
| *F01N 3/28* | (2006.01) |
| *F01N 3/20* | (2006.01) |
| *B01F 5/00* | (2006.01) |
| *B01F 5/04* | (2006.01) |
| *B01F 5/06* | (2006.01) |
| *B01F 3/04* | (2006.01) |

(52) U.S. Cl.
CPC .......... *F01N 3/2892* (2013.01); *B01F 3/04049* (2013.01); *B01F 5/0062* (2013.01); *B01F 5/0451* (2013.01); *B01F 5/0616* (2013.01); *F01N 3/2066* (2013.01); *F01N 2470/02* (2013.01); *Y02T 10/24* (2013.01)

(58) Field of Classification Search
CPC ........................... F01N 3/2892; F01N 2470/00
USPC .......................................................... 60/324
See application file for complete search history.

(56) References Cited

U.S. PATENT DOCUMENTS

| | | | |
|---|---|---|---|
| 3,797,240 A | 3/1974 | Inoue et al. | |
| 4,043,539 A | 8/1977 | Gilmer et al. | |
| 4,571,938 A | 2/1986 | Sakurai | |
| 4,909,635 A | 3/1990 | Lecoffre et al. | |
| 4,912,920 A | 4/1990 | Hirabayashi | |
| 5,339,630 A | 8/1994 | Pettit | |

(Continued)

FOREIGN PATENT DOCUMENTS

| | | |
|---|---|---|
| DE | 3940747 C1 | 7/1990 |
| DE | 4121940 A1 | 1/1993 |

(Continued)

OTHER PUBLICATIONS

English Translation of DE 102008029110 A1.*

*Primary Examiner* — Audrey K Bradley
*Assistant Examiner* — Anthony Ayala Delgado
(74) *Attorney, Agent, or Firm* — Harness, Dickey & Pierce, P.L.C.

(57) ABSTRACT

An aftertreatment system may include an exhaust pipe and a mixing pipe. The exhaust pipe may receive exhaust gas from an engine and may include a first portion defining a first longitudinal axis and a second portion defining a second longitudinal axis that is angled relative to the first axis. The mixing pipe may be disposed in the exhaust pipe and may include a tubular portion and a collar extending radially outward from the tubular portion. The tubular portion may include a plurality of openings and a plurality of deflectors. The plurality of openings may extend through inner and outer diametrical surfaces of the tubular portion. Each of the plurality of deflectors may be disposed adjacent a corresponding one of the plurality of openings.

18 Claims, 5 Drawing Sheets

(56) References Cited

U.S. PATENT DOCUMENTS

| | | | |
|---|---|---|---|
| 5,426,269 A | 6/1995 | Wagner et al. | |
| 6,442,933 B2 | 9/2002 | Rusch | |
| 6,449,947 B1 | 9/2002 | Liu et al. | |
| 6,536,420 B1 * | 3/2003 | Cheng | 123/590 |
| 6,722,123 B2 | 4/2004 | Liu et al. | |
| 6,722,124 B2 | 4/2004 | Pawson et al. | |
| 6,767,378 B2 | 7/2004 | Nishiyama et al. | |
| 7,328,572 B2 | 2/2008 | McKinley et al. | |
| 7,562,521 B2 | 7/2009 | Shirai et al. | |
| 7,748,212 B2 | 7/2010 | Sedlacek et al. | |
| 8,033,104 B2 | 10/2011 | Zhang | |
| 8,141,353 B2 | 3/2012 | Zheng et al. | |
| 8,181,446 B2 | 5/2012 | Honda et al. | |
| 8,215,450 B2 | 7/2012 | Chien | |
| 8,240,137 B2 | 8/2012 | Liu et al. | |
| 8,272,777 B2 | 9/2012 | Kohrs et al. | |
| 8,276,372 B2 | 10/2012 | Kowada | |
| 8,347,610 B2 | 1/2013 | Kowada | |
| 8,359,838 B2 | 1/2013 | Yamazaki et al. | |
| 8,375,709 B2 | 2/2013 | Salanta et al. | |
| 8,397,492 B2 | 3/2013 | Kowada | |
| 8,397,495 B2 | 3/2013 | Salanta et al. | |
| 8,499,548 B2 | 8/2013 | De Rudder et al. | |
| 2006/0218902 A1 | 10/2006 | Arellano et al. | |
| 2007/0245718 A1 | 10/2007 | Cheng et al. | |
| 2007/0274877 A1 | 11/2007 | Bush et al. | |
| 2008/0184700 A1 | 8/2008 | Harrer | |
| 2008/0216470 A1 | 9/2008 | Sedlacek et al. | |
| 2008/0250776 A1 | 10/2008 | Brown et al. | |
| 2008/0307780 A1 | 12/2008 | Iverson et al. | |
| 2009/0019843 A1 | 1/2009 | Levin et al. | |
| 2009/0178395 A1 | 7/2009 | Huffmeyer | |
| 2009/0255242 A1 | 10/2009 | Paterson et al. | |
| 2009/0313979 A1 * | 12/2009 | Kowada | 60/297 |
| 2010/0000205 A1 | 1/2010 | Freese, V | |
| 2010/0263359 A1 | 10/2010 | Haverkamp et al. | |
| 2011/0094206 A1 | 4/2011 | Liu et al. | |
| 2011/0099978 A1 | 5/2011 | Davidson et al. | |
| 2011/0308234 A1 | 12/2011 | De Rudder et al. | |
| 2012/0204541 A1 | 8/2012 | Li et al. | |
| 2013/0098002 A1 | 4/2013 | Danckert et al. | |
| 2013/0164181 A1 | 6/2013 | Iijima et al. | |
| 2013/0167516 A1 * | 7/2013 | Loman | F01N 3/2892 60/319 |
| 2014/0033686 A1 | 2/2014 | Fischer et al. | |
| 2014/0077400 A1 | 3/2014 | Sampath et al. | |

FOREIGN PATENT DOCUMENTS

| | | | |
|---|---|---|---|
| DE | 4203807 A1 | 8/1993 | |
| DE | 4307525 A1 | 9/1994 | |
| DE | 4417238 A1 | 9/1994 | |
| DE | 102008029110 | * 12/2009 | B01F 3/04049 |
| DE | 102009036511 A1 | 2/2011 | |
| DE | 102012010878 A1 | 12/2013 | |
| DE | 102013211662 A1 | 12/2014 | |
| EP | 0470361 A1 | 2/1992 | |
| EP | 1262644 A | 12/2002 | |
| EP | 1262644 A2 | 12/2002 | |
| EP | 2111916 A1 | 10/2009 | |
| EP | 2168672 A1 | 3/2010 | |
| EP | 2465602 A2 | 6/2012 | |
| JP | H10231721 A | 9/1998 | |
| WO | 03036056 A1 | 5/2003 | |
| WO | 2009024815 A2 | 2/2009 | |
| WO | 2012044233 A1 | 4/2012 | |
| WO | WO-2013087852 A2 | 6/2013 | |

* cited by examiner

PERFORATED MIXING PIPE WITH SWIRLER

FIELD

The present disclosure relates to an aftertreatment system for a vehicle, and more particularly, to an aftertreatment system having a perforated mixing pipe with a swirler.

BACKGROUND

This section provides background information related to the present disclosure and is not necessarily prior art.

Selective catalytic reduction technology has been used in conjunction with reducing nitrogen oxides present in the exhaust of combustion engines. Many vehicles utilizing combustion engines are equipped with exhaust aftertreatment devices for reducing nitrogen oxide emissions. Some of these systems are constructed using urea-based technology including a container for storing a reductant (e.g., urea) and a delivery system for transmitting the reductant from the container to the exhaust stream. A mixer is typically provided for mixing the injected reductant with the exhaust gas before the reductant reaches a catalyst with which the reductant reacts. While these systems may have performed well in the past, it may be desirable to provide an improved mixer to more efficiently and effectively mix the reductant with the exhaust stream and provide a more even distribution of reductant over a larger area of the catalyst while reducing impingement of the reductant fluid on surfaces of the mixer and reducing accumulation of reductant deposits.

SUMMARY

This section provides a general summary of the disclosure, and is not a comprehensive disclosure of its full scope or all of its features.

In one form, the present disclosure provides an aftertreatment system that may include an exhaust pipe and a mixing pipe. The exhaust pipe may receive exhaust gas from an engine and may include a first portion defining a first longitudinal axis and a second portion defining a second longitudinal axis that is angled relative to the first axis. The mixing pipe may be disposed in the exhaust pipe and may include a tubular portion and a collar extending radially outward from the tubular portion. The tubular portion may include a plurality of openings and a plurality of deflectors. The plurality of openings may extend through inner and outer diametrical surfaces of the tubular portion. Each of the plurality of deflectors may be disposed adjacent a corresponding one of the plurality of openings.

In some embodiments, the tubular portion may be coaxial with the second portion of the exhaust pipe.

In some embodiments, the deflectors may extend outward from the outer diametrical surface.

In some embodiments, the deflectors may extend inward from the inner diametrical surface.

In some embodiments, the collar may extend from a downstream end of the tubular portion.

In some embodiments, the collar may include a swirler having a plurality of blades extending radially outward from the tubular portion.

In some embodiments, each of the blades may include a radially inner end and a radially outer end. The radially outer ends may be spaced apart from each other.

In some embodiments, the radially outer ends contact an inner diametrical surface of the exhaust pipe.

In some embodiments, each of the blades may include a tab extending radially inward from an edge of the blade between the radially inner and outer ends.

In some embodiments, radially extending edges of the blades may be angled so that the radially inner end of each blade and the outer end of the same blade are rotationally misaligned with each other.

In some embodiments, an intersection between the first and second longitudinal axes may be disposed within the tubular portion.

In some embodiments, the first and second longitudinal axes may be substantially perpendicular to each other.

In some embodiments, the aftertreatment system may include a reductant injector disposed along the second longitudinal axis at an upstream end of the tubular portion.

In some embodiments, the aftertreatment system may include a catalyst disposed downstream of the mixing pipe.

In another form, the present disclosure provides an aftertreatment system that may include an exhaust pipe and a mixing pipe. The exhaust pipe may receive exhaust gas from an engine and may include a first portion defining a first longitudinal axis and a second portion defining a second longitudinal axis that is angled relative to the first axis. The mixing pipe may be disposed in the exhaust pipe and may include a tubular portion and a swirler extending radially from the tubular portion. The tubular portion may include a plurality of openings extending through inner and outer diametrical surfaces of the tubular portion. The swirler may include a plurality of blades extending radially outward from the tubular portion.

In some embodiments, the tubular portion may be coaxial with the second portion of the exhaust pipe.

In some embodiments, the tubular portion may include a plurality of deflectors. Each of the deflectors may be disposed adjacent a corresponding one of the plurality of openings.

In some embodiments, the deflectors may extend outward from the outer diametrical surface.

In some embodiments, the deflectors may extend inward from the inner diametrical surface.

In some embodiments, the swirler may extend from a downstream end of the tubular portion.

In some embodiments, each of the blades may include a radially inner end and a radially outer end. The radially outer ends may be spaced apart from each other.

In some embodiments, the radially outer ends may contact an inner diametrical surface of the exhaust pipe.

In some embodiments, each of the blades may include a tab extending radially inward from an edge of the blade between the radially inner and outer ends.

In some embodiments, radially extending edges of the blades may be angled so that the radially inner end of each blade and the outer end of the same blade are rotationally misaligned with each other.

In some embodiments, an intersection between the first and second longitudinal axes may be disposed within the tubular portion.

In some embodiments, the first and second longitudinal axes may be substantially perpendicular to each other.

In some embodiments, the aftertreatment system may include a reductant injector disposed along the second longitudinal axis at an upstream end of the tubular portion.

In some embodiments, the aftertreatment system may include a catalyst disposed downstream of the mixing pipe.

In another form, the present disclosure provides a method of mixing exhaust gas and reductant in an aftertreatment system. The method may include providing a mixing device in an exhaust pipe through which exhaust gas from an engine flows. The mixing device may include a tubular portion. A first portion of the exhaust gas may be received in the tubular portion through a plurality of openings in the tubular portion. A second portion of the exhaust gas may be allowed to flow between the tubular portion and an inner diametrical surface of the exhaust pipe. Reductant may be injected into the tubular portion. A first swirling flow pattern may be generated within the tubular portion. A second swirling flow pattern may be generated with the second portion of the exhaust gas the second swirling flow pattern surrounding the first swirling flow pattern.

In some embodiments, the first swirling flow pattern may be generated with a plurality of deflectors extending radially outward from the tubular portion.

In some embodiments, the first swirling flow pattern may be generated with a plurality of deflectors extending radially inward from the tubular portion.

In some embodiments, the second swirling flow pattern may be generated with a plurality of blades extending radially outward from the tubular portion.

In some embodiments, the method may include blending the first and second swirling flow patterns downstream of the mixing device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
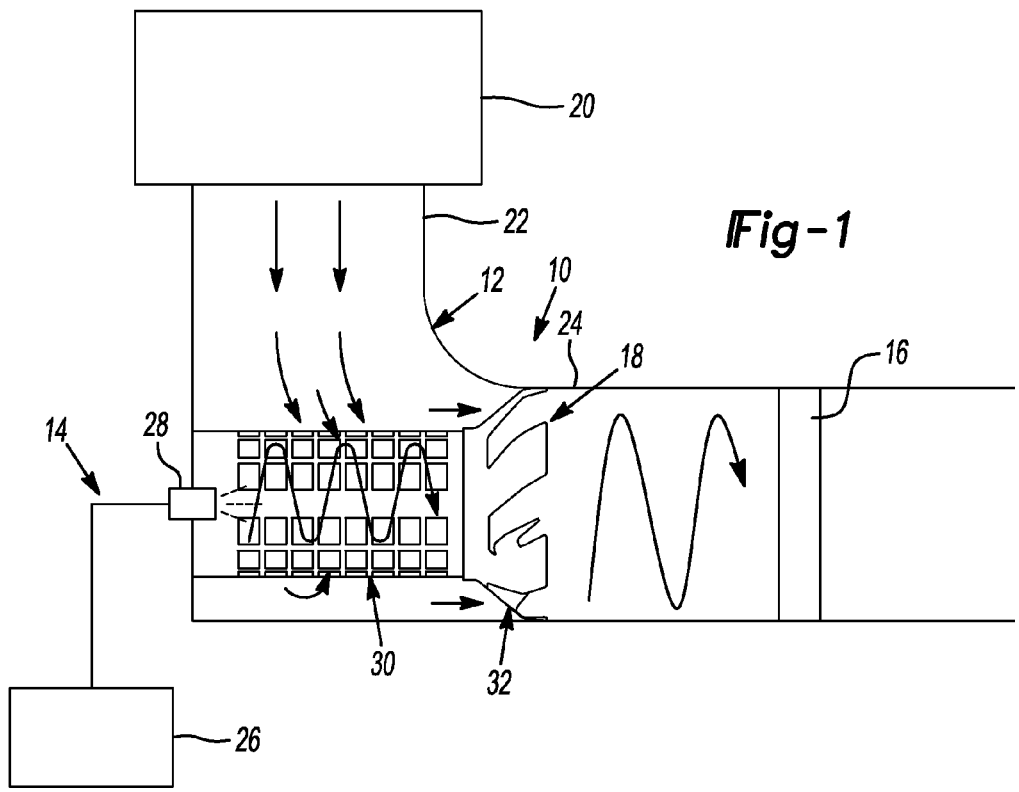
FIG. 1 is a schematic representation of an engine and an exhaust aftertreatment system according to the principles of the present disclosure.
Figure 2:
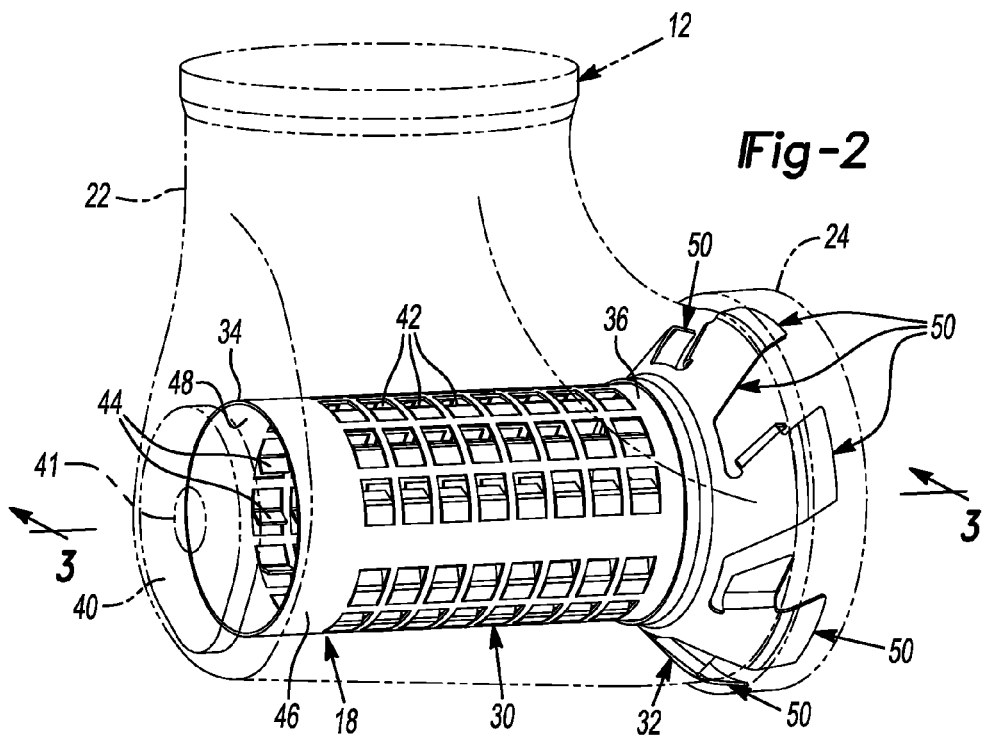
FIG. 2 is a perspective view of a mixing pipe disposed in an exhaust pipe of the aftertreatment system.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may include an exhaust pipe 12, a reductant delivery system 14, an aftertreatment device 16 and a mixing pipe 18. The exhaust pipe 12 may receive exhaust gas discharged from a combustion engine 20. Exhaust gas discharged into the exhaust pipe 12 may flow through the mixing pipe 18 and the aftertreatment device 16 before being discharged to the ambient environment.

Figure 3:
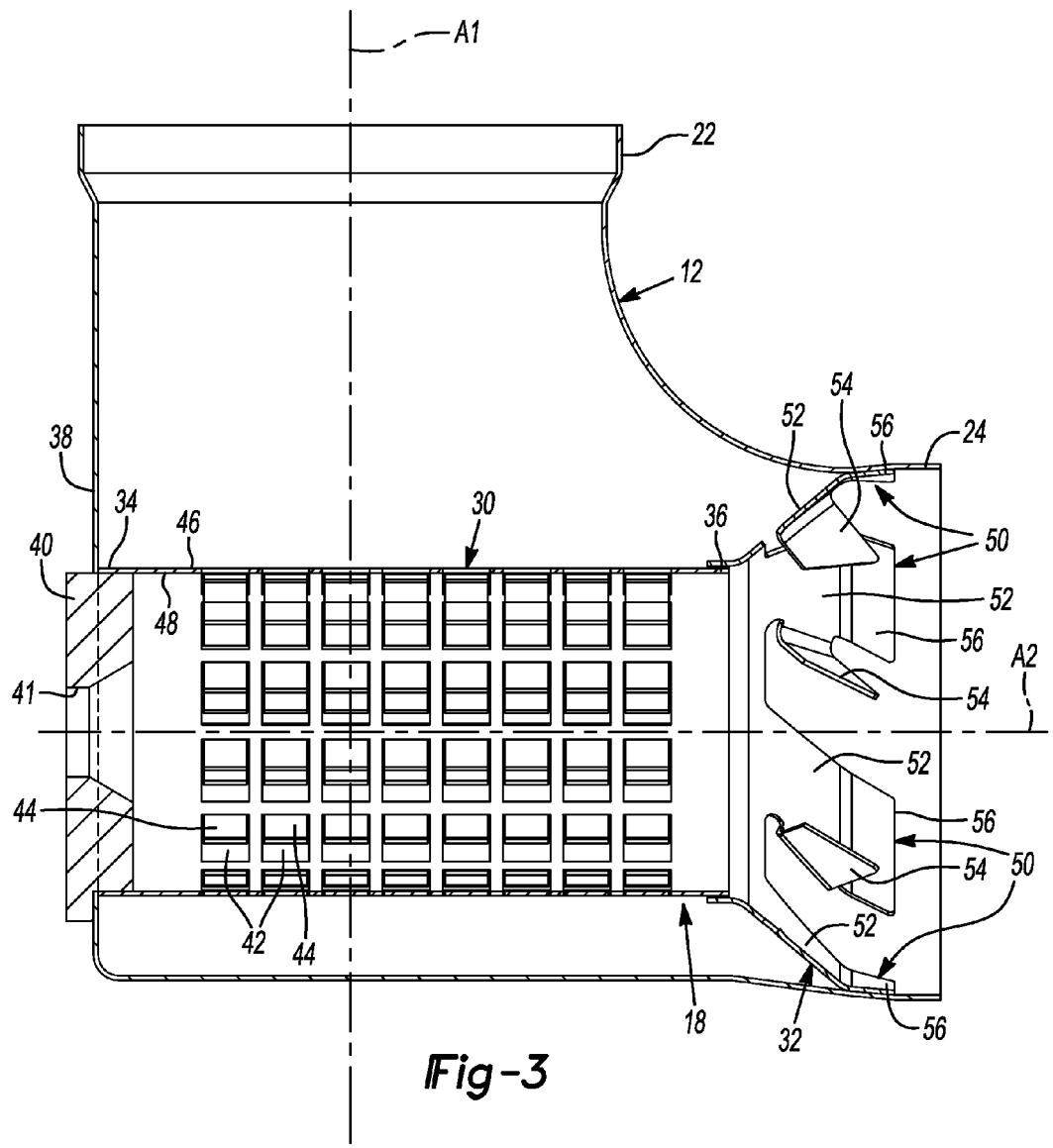
FIG. 3 is a cross-sectional view of the mixing pipe and exhaust pipe of FIG. 2.
Figure 4:
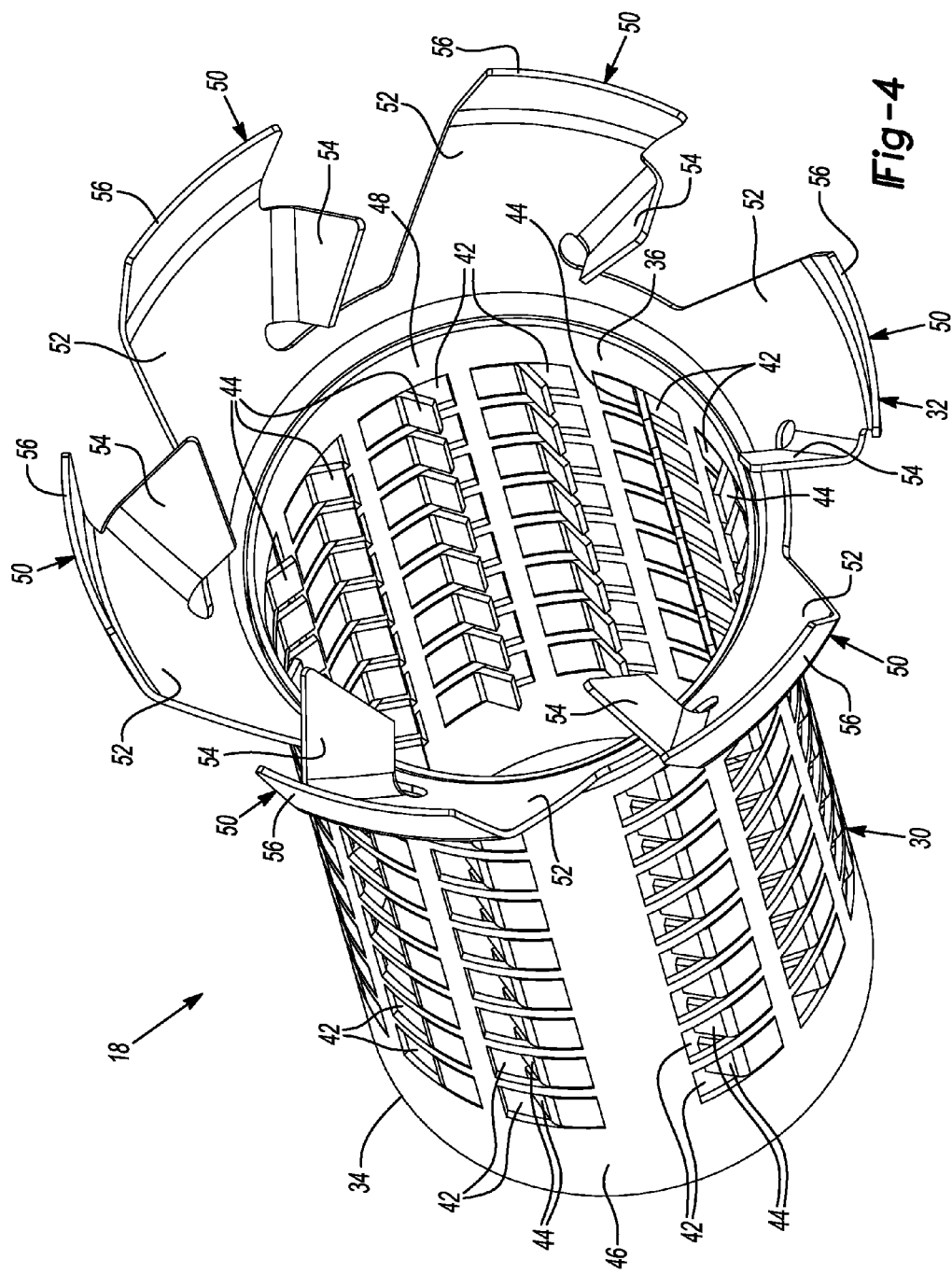
FIG. 4 is a perspective view of the mixing pipe.

The exhaust pipe 12 may include first and second portions 22, 24 defining a ninety-degree bend. The first portion 22 may be defined by a first longitudinal axis A1 (FIG. 3), and the second portion 24 may be defined by a second longitudinal axis A2 (FIG. 3). While the exhaust pipe 12 is shown in the figures as having a ninety-degree bend, it will be appreciated that the exhaust pipe 12 could have a bend of less than or greater than ninety degrees and could have any suitable configuration such as an S-shape (i.e., multiple bends), for example. In some embodiments, the exhaust pipe 12 may include a third portion (not shown) downstream of the second portion 24 that may be approximately parallel to the first portion 22.

The reductant delivery system 14 may pump reductant (e.g., urea or ammonia) from a tank 26 to a reductant injector 28 that may spray the reductant into the exhaust stream at or upstream of the mixing pipe 18. The mixing pipe 18 may mix the reductant with the exhaust gas to provide a more uniform mixture of reductant and exhaust gas before the mixture enters the aftertreatment device 16 as well as to convert urea to ammonia by promoting evaporation of the water.

The aftertreatment device 16 can be an SCR (selective catalytic reduction) catalyst, for example. A reaction between the reductant and the aftertreatment device 16 may convert nitrogen oxides in the exhaust gas to nitrogen ($N_2$), water and/or carbon dioxide, for example.

Referring now to FIGS. 1-5, the mixing pipe 18 may include a tubular portion 30, and a swirler or collar 32. A first portion of the exhaust gas flowing through the exhaust pipe 12 may flow into the tubular portion 30 and a second portion of the exhaust gas may flow around the tubular portion 30 and through the collar 32. The tubular portion 30 may include an upstream end 34 and a downstream end 36. The upstream end 34 may abut a wall 38 of the first portion 22 of the exhaust pipe 12. An injector mounting plate 40 may extend through the wall 38 and into the tubular portion 30 at the upstream end 34. The reductant injector 28 may extend through an aperture 41 in the injector mounting plate 40 and may extend into the tubular portion 30.

The tubular portion 30 may include a longitudinal axis that is collinear with the second longitudinal axis A2 (FIG. 3). The tubular portion 30 may include an outer diameter that is less than an inner diameter of the first and second portions 22, 24 of the exhaust pipe 12. The tubular portion 30 may include a plurality of openings 42 and a plurality of deflectors 44 arranged in rows extending around the diameter of the tubular portion 30 and in columns extending between the upstream and downstream ends 34, 36 of the tubular portion 30. The openings 42 may extend through outer and inner diametrical surfaces 46, 48 of the tubular portion 30. The deflectors 44 may be partially cut or stamped out of the tubular portion 30 (thereby forming the openings 42) and bent inward into the tubular portion 30.

Some of the fluid flowing through the exhaust pipe 12 from the first portion 22 to the second portion 24 may enter the tubular portion 30 through the openings 42 and may be directed by the deflectors 44 in a rotational direction to generate a first swirling flow pattern within the tubular portion 30 that swirls around the longitudinal axis A2. This swirling flow pattern facilitates atomization of the reductant and mixing of the reductant with the exhaust gas. The swirling flow pattern may also restrict or prevent impingement of the reductant fluid on the surfaces of the mixing pipe 18, the exhaust pipe 12 and/or the aftertreatment device 16, which reduces the formation and/or buildup of reductant deposits on the mixing pipe, exhaust pipe 12 and the aftertreatment device 16. In some embodiments, the mixing pipe 18 may include a hydrolysis coating to further reduce the formation and/or buildup of reductant deposits on the mixing pipe 18.

Figure 5:
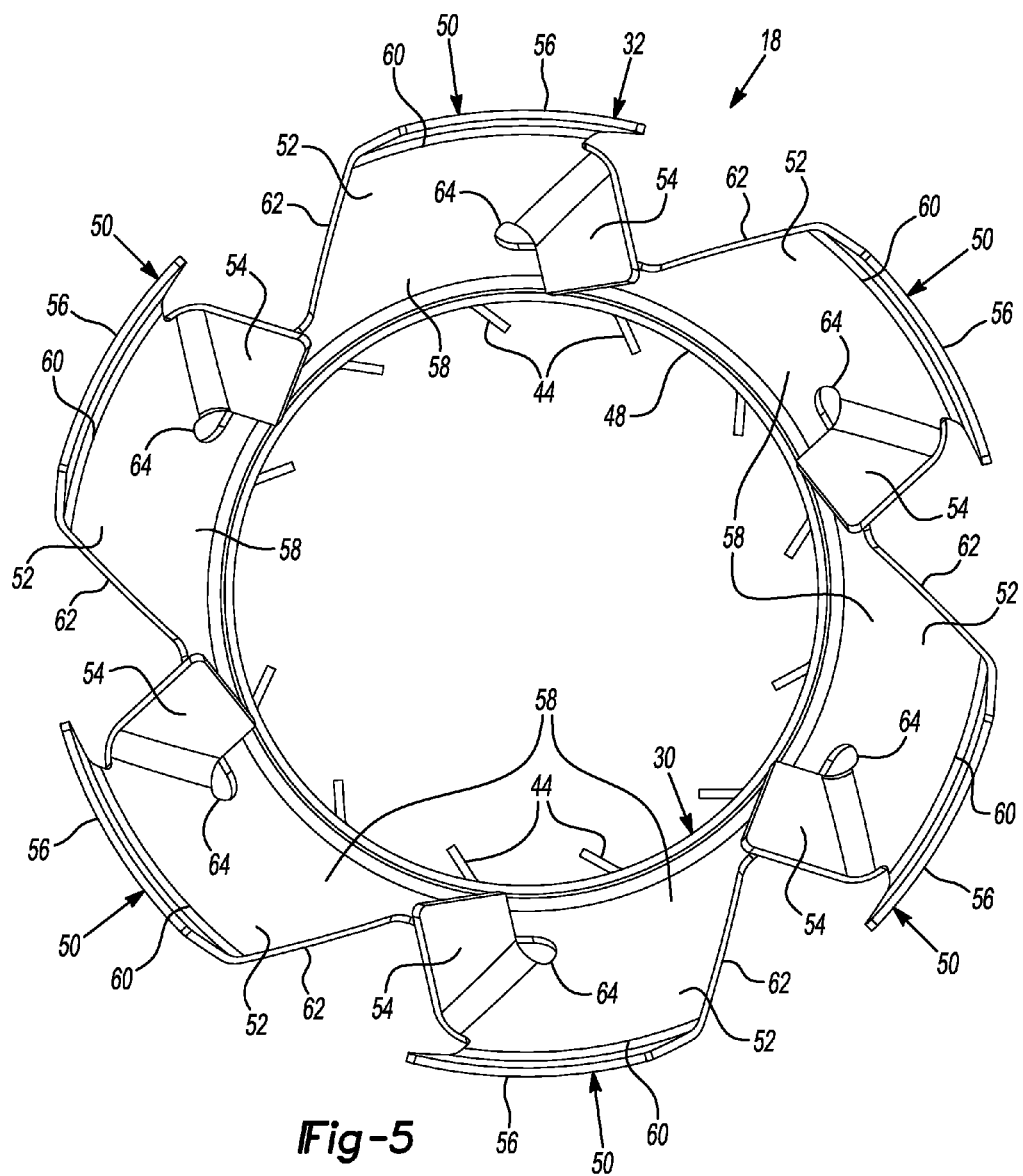
FIG. 5 is a plan view of a downstream end of the mixing pipe.
Figure 6:
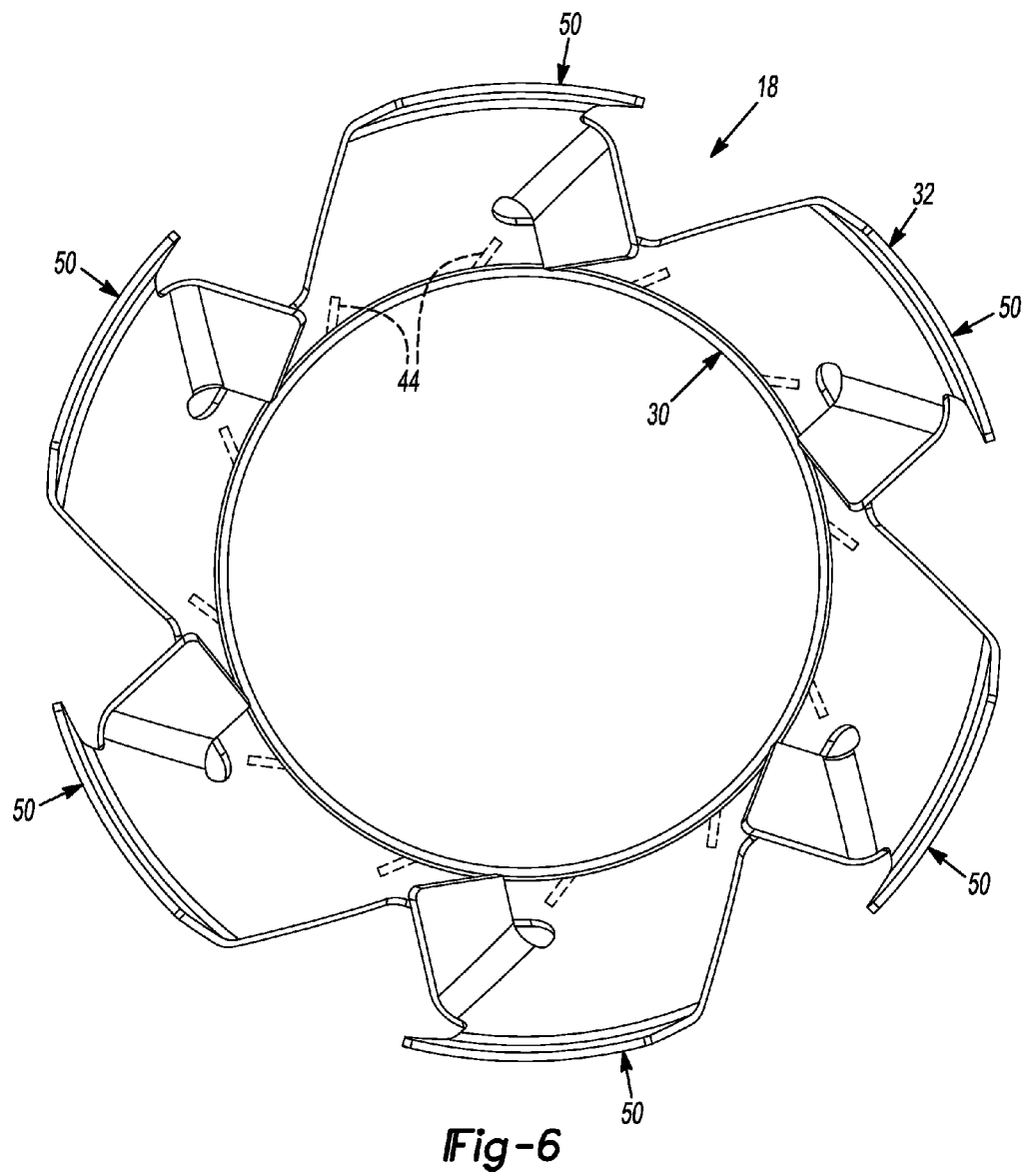
FIG. 6 is a plan view of a downstream end of another embodiment of a mixing pipe according to the principles of the present disclosure.

While the deflectors 44 are shown in FIGS. 2-5 as extending inward into the tubular portion 30, in some embodiments, the deflectors 44 may be formed to extend outward from the outer diametrical surface 46 of the tubular portion 30, as shown in FIG. 6. With the deflectors 44 extending radially outward, the opportunity for reductant deposits to form on the deflectors 44 may be further reduced, while the swirling flow pattern within the tubular portion 30 is still able to be effectively generated.

The collar 32 may be generally conical in its overall shape and may extend radially outward and axially downstream from the downstream end 36 of the tubular portion 30. The collar 32 may be welded and/or otherwise secured to the tubular portion 30. In some embodiments, the collar 32 may be integrally formed with the tubular portion 30. The collar 32 may include a plurality of blades 50 arranged in a circular array extending around the longitudinal axis of the tubular portion 30. Each of the blades 50 may include a body 52 and first and second tabs 54, 56 extending from the body 52. The body 52 may be disposed at an angle relative to the longitudinal axis of the tubular portion 30 and may include a proximal end 58 (i.e., a radially inner end), a distal end 60 (i.e., a radially outer end), and first and second lateral edges 62, 64 extending between the proximal and distal ends 58, 60, as shown in FIG. 5. The angle of the body 52 relative to the longitudinal axis may be customized for a particular application to achieve a desired amount of turbulence. The first tab 54 may extend radially inward from the second lateral edge 64 toward the longitudinal axis of the tubular portion 30. The second tab 56 may radially outward and axially downstream from the distal end 60. The second tabs 56 may contact the inner diametrical surface of the second portion 24 of the exhaust pipe 12. In some embodiments, the second tabs 56 may be welded and/or otherwise fixed to the inner diametrical surface of the second portion 24.

As shown in FIG. 5, the lateral edges 62, 64 of the body 52 may be angled so that the proximal end 58 of each blade 50 and the distal end 60 of the same blade 50 are rotationally misaligned with each other. That is, each blade 50 may be angled to extend in a generally clockwise direction as it extends radially outward from the tubular portion 30 when viewed from the frame of reference of FIG. 5. It will be appreciated that in some embodiments, the blades 50 could be angled to extend in a generally counterclockwise direction as they extend radially outward from the tubular portion 30 when viewed from the frame of reference of FIG. 5.

The geometry of the blades 50 and the orientation of the blades 50 relative to each other, the tubular portion 30 and the exhaust pipe 12 may cause the fluid flowing through the collar 32 to flow in a second rotational or swirling flow pattern around the longitudinal axis A2 and around the first swirling flow pattern of fluid that flowed through the tubular portion 30. These two coaxial swirling flow patterns may result in improved mixture of the reductant and exhaust gas before the reductant and exhaust gas flow into the aftertreatment device 16. Furthermore, this improved mixing can be accomplished with a shorter length of pipe between the reductant injector 28 and the aftertreatment device 16 than may have been required for adequate mixing in prior-art aftertreatment systems.

It will be appreciated that the blades 50 and the deflectors 44 could be oriented so that the first and second swirling flow patterns rotate in the same rotational direction or in opposite rotational directions. In some embodiments, the tubular portion 30 could include scoops (not shown) that extend radially inward or radially outward therefrom in addition to or instead of the generally flat deflectors 44. Additionally or alternatively, the collar 32 could include scoops (not shown) in addition to or instead of the blades 50. The scoops could include a geometry that curves in three dimensions and/or spiraled geometry, for example, to induce a swirling flow pattern. In some embodiments, the collar 32 could be a conical or funnel-shaped member having one or more openings therein instead of a plurality of blades or scoops.

While the mixing pipe 18 is described above as being used in a SCR dosing application, it will be appreciate that the mixing pipe 18 could be used in a hydrocarbon dosing application, in which the mixing pipe 18 may mix injected hydrocarbon with the exhaust gas.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aftertreatment system comprising:
   an exhaust pipe receiving exhaust gas from an engine and including a first portion defining a first longitudinal axis and a second portion defining a second longitudinal axis that is angled relative to the first axis; and
   a mixing pipe disposed in the exhaust pipe and including a tubular portion and a collar extending radially outward from the tubular portion, the collar comprising a swirler having a plurality of blades extending radially outward from the tubular portion, the tubular portion including a plurality of openings and a plurality of deflectors, the plurality of openings extending through inner and outer diametrical surfaces of the tubular portion, each of the plurality of deflectors disposed adjacent a corresponding one of the plurality of openings, wherein each of the blades includes a radially inner end and a radially outer end, the radially outer ends being spaced apart from each other.

2. The aftertreatment system of claim 1, wherein the deflectors extend inward from the inner diametrical surface.

3. The aftertreatment system of claim 1, wherein the collar extends from a downstream end of the tubular portion.

4. The aftertreatment system of claim 1, wherein each of the blades includes a tab extending radially inward from an edge of the blade between the radially inner and outer ends.

5. The aftertreatment system of claim 1, wherein radially extending edges of the blades are angled so that the radially inner end of each blade and the outer end of the same blade are rotationally misaligned with each other.

6. The aftertreatment system of claim 1, further comprising: a reductant injector disposed along the second longitudinal axis at an upstream end of the tubular portion; and a catalyst disposed downstream of the mixing pipe and the reductant injector.

7. An aftertreatment system comprising:
   an exhaust pipe receiving exhaust gas from an engine and including a first portion defining a first longitudinal axis and a second portion defining a second longitudinal axis that is angled relative to the first axis; and
   a mixing pipe disposed in the exhaust pipe and including a tubular portion and a swirler extending radially from the tubular portion, the tubular portion including a plurality of openings extending through inner and outer diametrical surfaces of the tubular portion, the swirler comprising a plurality of blades extending radially outward from the tubular portion, wherein each of the blades includes a radially inner end and a radially outer end, the radially outer ends being spaced apart from each other.

8. The aftertreatment system of claim 7, wherein the tubular portion includes a plurality of deflectors, each of the deflectors is disposed adjacent a corresponding one of the plurality of openings.

9. The aftertreatment system of claim 8, wherein the deflectors extend inward from the inner diametrical surface.

10. The aftertreatment system of claim 7, wherein the swirler extends from a downstream end of the tubular portion.

11. The aftertreatment system of claim 7, wherein each of the blades includes a tab extending radially inward from an edge of the blade between the radially inner and outer ends.

12. The aftertreatment system of claim 7, wherein radially extending edges of the blades are angled so that the radially inner end of each blade and the outer end of the same blade are rotationally misaligned with each other.

13. The aftertreatment system of claim 7, further comprising: a reductant injector disposed along the second longitudinal axis at an upstream end of the tubular portion; and a catalyst disposed downstream of the mixing pipe and the reductant injector.

14. An aftertreatment system comprising:
   an exhaust pipe receiving exhaust gas from an engine and including a first portion defining a first longitudinal axis and a second portion defining a second longitudinal axis that is angled relative to the first axis; and
   a mixing pipe disposed in the exhaust pipe and including a tubular portion and a collar extending radially outward from the tubular portion, the collar comprising a swirler having a plurality of blades extending radially outward from the tubular portion, the tubular portion including a plurality of openings and a plurality of deflectors, the plurality of openings extending through inner and outer diametrical surfaces of the tubular portion, each of the plurality of deflectors disposed adjacent a corresponding one of the plurality of openings, wherein the deflectors extend outward from the outer diametrical surface.

15. An aftertreatment system comprising:
   an exhaust pipe receiving exhaust gas from an engine and including a first portion defining a first longitudinal axis and a second portion defining a second longitudinal axis that is angled relative to the first axis; and
   a mixing pipe disposed in the exhaust pipe and including a tubular portion and a swirler extending radially from the tubular portion, the tubular portion including a plurality of openings extending through inner and outer diametrical surfaces of the tubular portion, the swirler comprising a plurality of blades extending radially outward from the tubular portion, wherein the deflectors extend outward from the outer diametrical surface.

16. A method of mixing exhaust gas and reductant in an aftertreatment system, the method comprising:
   providing a mixing device in an exhaust pipe through which exhaust gas from an engine flows, the mixing device including a tubular portion;
   receiving a first portion of the exhaust gas in the tubular portion through a plurality of openings in the tubular portion;
   allowing a second portion of the exhaust gas to flow between the tubular portion and an inner diametrical surface of the exhaust pipe;
   injecting reductant into the tubular portion;

generating a first swirling flow pattern within the tubular portion; and generating a second swirling flow pattern with the second portion of the exhaust gas, the second swirling flow pattern surrounding the first swirling flow pattern downstream of the tubular portion of the mixing device, wherein the second swirling flow pattern is generated with a plurality of blades extending radially outward from the tubular portion, wherein the first swirling flow pattern is generated with a plurality of deflectors extending radially outward from the tubular portion.

17. The method of claim 16, wherein the first swirling flow pattern is generated with a plurality of deflectors extending radially inward from the tubular portion.

18. The method of claim 16, further comprising blending the first and second swirling flow patterns downstream of the mixing device.

\* \* \* \* \*